United States Patent
Suga et al.

(10) Patent No.: US 6,557,342 B2
(45) Date of Patent: May 6, 2003

(54) EXHAUST GAS PURIFYING SYSTEM

(75) Inventors: Katsuo Suga, Yokohama (JP);
Yasunari Hanaki, Kanagawa (JP);
Maki Shimada, Kanagawa (JP);
Hiroshi Akama, Kanagawa (JP);
Motohisa Kamijo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/948,876

(22) Filed: Sep. 10, 2001

(65) Prior Publication Data

US 2002/0056270 A1 May 16, 2002

(30) Foreign Application Priority Data

Sep. 19, 2000 (JP) ........................................ 2000-283961

(51) Int. Cl.$^7$ ................................................. F01N 3/10
(52) U.S. Cl. ............................................. 60/301; 60/303
(58) Field of Search .......................... 60/274, 285, 286, 60/299, 301; 123/1 A, 3, 478

(56) References Cited

U.S. PATENT DOCUMENTS

| | | | | |
|---|---|---|---|---|
| 3,908,365 A | * | 9/1975 | Schweibold et al. | 60/301 |
| 4,562,818 A | * | 1/1986 | Kohama et al. | 123/478 |
| 5,272,871 A | * | 12/1993 | Oshima et al. | 60/301 |
| 5,297,515 A | * | 3/1994 | Gale et al. | 123/3 |
| 5,412,946 A | * | 5/1995 | Oshima et al. | 60/286 |
| 5,867,982 A | * | 2/1999 | Tengblad et al. | 60/285 |
| 6,176,078 B1 | * | 1/2001 | Balko et al. | 60/286 |
| 6,187,709 B1 | * | 2/2001 | McCabe | 60/299 |
| 6,244,044 B1 | * | 6/2001 | Bartley | 60/274 |

FOREIGN PATENT DOCUMENTS

| | | | |
|---|---|---|---|
| DE | 4427665 | * | 2/1996 |
| JP | 5-168860 | | 7/1993 |
| JP | 9-57098 | | 3/1997 |

* cited by examiner

Primary Examiner—Thomas Denion
Assistant Examiner—Tu M. Nguyen
(74) Attorney, Agent, or Firm—Foley & Lardner

(57) ABSTRACT

An exhaust gas purifying system for an internal combustion engine mounted on an automotive vehicle. The exhaust gas purifying system may include an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5 by volume and such that a volume concentration ratio of hydrogen/carbon monoxide is not smaller than 0.5, in a first exhaust gas condition in which air/fuel ratio of exhaust gas is within a range of from a rich value and a stoichiometric value. Additionally, a NOx adsorbing and reducing catalyst is disposed in the exhaust gas passageway downstream of the exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition.

8 Claims, 2 Drawing Sheets

EXHAUST GAS PURIFYING SYSTEM

BACKGROUND OF THE INVENTION

This invention relates to improvements in an exhaust gas purifying system for purifying exhaust gas discharged from an internal combustion engine (gasoline-fueled or diesel) of an automotive vehicle or a boiler, regarding noxious components such as hydrocarbons (HC), carbon monoxide (CO) and nitrogen oxides (NOx), and more particularly to the exhaust gas purifying system for effectively removing NOx, HC and CO in an oxygen-excessive region (lean region) or a low temperature region of exhaust gas.

In recent years, automotive vehicles of a low fuel consumption have been eagerly desired from the view points of exhaustion of petroleum resource and warming-up phenomena of the earth. Regarding automotive vehicles with a gasoline-fueled engine, attention has been paid on development of automotive vehicles provided with a so-called lean-burn engine. In the automotive vehicles provided with the lean-burn engine, exhaust gas is in an oxygen-excessive or lean region (atmosphere) in which an air-fuel (air/fuel) ratio is leaner or larger than a stoichiometric value. In case that a usual three-way catalyst is used in the lean region, removing or reducing NOx can be insufficient under the effect of the excessive oxygen. Accordingly, development of a catalyst for effectively reducing NOx even under an oxygen-excessive condition has been desired.

A catalyst for reducing NOx in such a lean region has been proposed as disclosed in Japanese Patent Provisional Publication No. 5-168860 in which Pt and lanthanum are carried on a porous carrier so that NOx is adsorbed in the lean region and released in a stochiometric region in which exhaust gas has a stoichiometric air-fuel (air/fuel) ratio. However, there is the problem that a sufficient NOx reducing effect cannot be obtained even if such a catalyst is used.

Otherwise, the three-way catalyst has hitherto been used to simultaneously carry out oxidation of CO and HC and reduction of NOx in exhaust gas from a gasoline-fueled engine. A representative example of such a three-way catalyst is produced by forming a carrier layer of $\gamma$-alumina on a heat-resistant substrate of cordierite or the like, and by causing catalytic noble metals such as platinum (Pt), palladium (Pd) and rhodium (Rh) to be carried on the carrier layer.

Now, from the viewpoint of protection for global environment, carbon dioxide ($CO_2$) in exhaust gas discharged from the internal combustion engine of an automotive vehicle or the like is problematic. In view of this, the lean-burn engine for accomplish lean-burn in the lean region and diesel engine seem to be full of promise. These engines can improve the fuel consumption or economy of the automotive vehicle under the effect of reduction of fuel to be consumed thereby suppressing generation of $CO_2$ as a combustion or exhaust gas from the engine. Such a catalyst for removing HC, CO and NOx in the lean region is disclosed in Japanese Patent Provisional Publication No. 9-57098. In this catalyst, Pt and Rh are carried separate from Pd so that NOx is reduced under the action of Pt upon being adsorbed or trapped in a NOx adsorbing or trapping material while HC and CO in a stochiometric or rich region is oxidized under the action of Pd.

However, the above NOx adsorbing material is not advantageous for adsorption or trap of NOx in a considerably low temperature region (not higher than 140° C.), and therefore there is the possibility of lowering the absorption amount of NOx. Additionally, it has been known that the catalytic activity of the catalyst varies according to the kinds of the catalytic noble metals to be used. Additionally, Pd tends to be easily poisoned with sulfur compounds existing in exhaust gas, as compared with Pt. Further, it has been known that NO, HC and the like coexisting in exhaust gas impede the catalytic activity for oxidation of CO in the considerably low temperature region of exhaust gas.

SUMMARY OF THE INVENTION

It is, therefore, an object of the present invention to provide an improved exhaust gas purifying system for an internal combustion engine, which can overcome drawbacks encountered in conventional exhaust gas purifying systems including catalysts for purifying exhaust gas.

Another object of the present invention is to provide an improved exhaust gas purifying system for an internal combustion engine, which can effectively remove or reduce NOx in exhaust gas in an oxygen-excessive or lean region, discharged from the engine by regulating the concentrations of the gas components of exhaust gas.

A further object of the present invention is to provide an improved exhaust gas purifying system for an internal combustion engine, which can effectively remove or oxidize CO and HC in exhaust gas even in a low temperature region by regulating adsorption and release of NOx in accordance with the temperature of exhaust gas.

A still further object of the present invention is to provide an improved exhaust gas purifying system for an internal combustion engine, which can effectively remove or reduce NOx in exhaust gas in an oxygen-excessive or lean region, discharged from the engine by regulating the concentrations of the gas components of exhaust gas, while effectively removing or oxidizing CO and HC in exhaust gas even in a low temperature region by regulating adsorption and release of NOx in accordance with the temperature of exhaust gas.

An aspect of the present invention resides in an exhaust gas purifying system for an internal combustion engine, comprising an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5 by volume and such that a volume concentration ratio of [hydrogen/carbon monoxide] is not smaller than 0.5, in a first exhaust gas condition in which air/fuel ratio of exhaust gas is within a range of from a rich value and a stoichiometric value. Additionally, a NOx adsorbing and reducing catalyst is disposed in the exhaust gas passageway downstream of the exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition.

Another aspect of the present invention resides in an exhaust gas purifying system for an internal combustion engine, comprising a NOx adsorbing catalyst disposed in an exhaust gas passageway of the engine, the NOx adsorbing catalyst adapted to adsorb and release nitrogen oxides in accordance with a temperature of exhaust gas, the NOx adsorbing catalyst adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature range in which exhaust gas has a temperature of not lower than 200° C. Exhaust gas discharged from the NOx adsorbing catalyst has a volume concentration ratio of [nitrogen oxides/carbon monoxide] which is not larger than 0.3 in the first exhaust gas temperature range. Additionally, an oxidizing catalyst is disposed in the exhaust gas passageway downstream of the NOx adsorbing catalyst, for oxidizing oxidizable components in exhaust gas discharged from the NOx adsorbing catalyst.

A further aspect of the present invention resides in a NOx adsorbing catalyst used in an exhaust gas purifying system for an internal combustion engine. The NOx adsorbing catalyst disposed in an exhaust gas passageway of the engine and adapted to adsorb and release nitrogen oxides in exhaust gas in accordance with a temperature of exhaust gas. The exhaust gas purifying system includes an oxidizing catalyst in the exhaust gas passageway downstream of the NOx adsorbing catalyst, for oxidizing oxidizable components in exhaust gas discharged from the NOx adsorbing catalyst. In the above exhaust gas purifying system, the NOx adsorbing catalyst is adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature condition in which exhaust gas has a temperature of not lower than 200° C. Exhaust gas discharged from the NOx adsorbing catalyst has a volume concentration ratio of [nitrogen oxides/carbon monoxide] which is not larger than 0.3 in the first exhaust gas temperature range.

A still further aspect of the present invention resides in an exhaust gas purifying system for an internal combustion engine, comprising an exhaust gas component regulating device disposed in an exhaust gas passageway of the engine, at least one of a NOx adsorbing and reducing catalyst and a NOx adsorbing catalyst disposed in the exhaust gas passageway downstream of the exhaust gas component regulating device, and an oxidizing catalyst in the exhaust gas passageway downstream of the at least one of the NOx adsorbing and reducing catalyst and the NOx adsorbing catalyst. In the above exhaust gas purifying system, the exhaust gas component concentration regulating device is adapted to regulate concentrations of gas components in exhaust gas discharged from the engine such that the concentrations of carbon monoxide and hydrogen are respectively not more than 2.0% by volume and not less than 0.5% by volume and such that a volume concentration ratio of [hydrogen/carbon monoxide] is not smaller than 0.5, in a first exhaust gas condition in which air/fuel ratio of exhaust gas is within a range of from a rich value and a stoichiometric value; the NOx adsorbing and reducing catalyst is adapted to adsorb nitrogen oxides in a second exhaust gas condition in which the air/fuel ratio of exhaust gas is at a lean value, and reducing the nitrogen oxides into nitrogen in the first exhaust gas condition; the NOx adsorbing catalyst is adapted to adsorb and release nitrogen oxides in accordance with a temperature of exhaust gas, the NOx adsorbing catalyst adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature range in which exhaust gas has a temperature of not lower than 200° C., exhaust gas discharged from the NOx adsorbing catalyst having a volume concentration ratio of [nitrogen oxides/carbon monoxide] which is not larger than 0.3 in the first exhaust gas temperature range; and the oxidizing catalyst is adapted to oxidize oxidizable components in exhaust gas discharged from the at least one of the NOx adsorbing and reducing catalyst and the NOx adsorbing catalyst.

DETAILED DESCRIPTION OF THE INVENTION

A first embodiment of an exhaust gas purifying system according to the present invention will be discussed hereinafter.

The exhaust gas purifying system is for an internal combustion engine and comprises an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5% by volume and such that a concentration ratio (volume) of [hydrogen ($H_2$)/carbon monoxide (CO)] is not smaller than 0.5, in a first exhaust gas condition in which air/fuel ratio of exhaust gas is within a range of from a rich value and a stoichiometric value. Additionally, a NOx adsorbing (trapping) and reducing catalyst disposed in the exhaust gas passageway downstream of the exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition. The engine is, in this instance, for an automotive vehicle. The rich value means an air/fuel ratio which is richer (in fuel) or smaller than the stoichiometric value. The lean value means an air/fuel ratio which is leaner (in fuel) or larger than the stoichiometric value.

As a result of study of the present inventors on reactions of from adsorbed NOx to $N_2$, the principle of exhaust gas purification of the present invention has been derived from the findings that $H_2$ can promote the most effectively the reactions and also from the finding that promotion of the reactions under the action of $H_2$ cannot be sufficiently made if a noble metal is covered with CO. In other words, NOx can be effectively removed or reduced by reducing the concentration of CO while maintaining a certain concentration of $H_2$ at a location (in the exhaust gas passageway) immediately upstream of a catalyst for reducing NOx.

In addition, regulating the above concentrations and concentration ratio of carbon monoxide and hydrogen to be flown to the NOx adsorbing and reducing catalyst has been derived from the following findings as a result of further study of the present inventors on the basis of the above findings: In case that the concentration of carbon monoxide is not more than 2.0% by volume, a reaction hindrance due to CO can be reduced. In case that the concentration of $H_2$ is not less than 0.5% by volume, a conversion efficiency of NOx to $N_2$ becomes sufficient. Additionally, a balance between the reaction hindrance due to CO and the reaction promotion due to $H_2$ becomes appropriate when the concentration ratio of [$H_2$/CO] is not smaller than 0.5.

In general, the concentration ratio between $H_2$ and CO in exhaust gas discharged from an automotive internal combustion engine is determined according to a thermal equilibrium in a water gas shift reaction represented by the following reaction formula (1):

$$CO + H_2O \rightarrow CO_2 + H_2 \qquad (1)$$

The concentration ratio of [$H_2$/CO] is usually about 0.3. This concentration ratio can be raised by disposing the above exhaust gas component concentration regulating device in the exhaust gas passageway, thereby improving the conversion (removal) efficiency of NOx in the NOx adsorbing and reducing catalyst located downstream of the exhaust gas component concentration regulating device.

The NOx adsorbing and reducing catalyst is adapted to adsorb (trap) NOx during a lean operation of the engine and to reduce the adsorbed NOx into $N_2$ during rich or stoichiometric operation of the engine. In the lean operation, the engine is operated on an air-fuel mixture having an air/fuel ratio leaner (larger) than a stoichiometric value so as to discharge exhaust gas having an air/fuel ratio leaner (larger) than the stoichiometric value. In the rich operation, the engine is operated on an air-fuel mixture having an air/fuel ratio richer (smaller) than the stoichiometric value so as to discharge exhaust gas having an air/fuel ratio richer (smaller) than the stoichiometric value. In the stoichiometric operation, the engine is operated on an air-fuel mixture having an stoichiometric air/fuel ratio so as to discharge exhaust gas having a stoichiometric air/fuel ratio.

The NOx adsorbing and reducing catalyst contains noble metals such as Pt, Pd and/or Rh (including any combinations of the noble metals), and a porous carrier or substrate carrying the noble metals, such as alumina and/or the like. The NOx adsorbing and reducing catalyst further contains alkali metals and/or alkaline earth metals such as sodium (Na), potassium (K), rubidium (Rb), cesium (Cs), magnesium (Mg), calcium (Ca), strontium (Sr), barium (Ba) and/or the like (including any combinations of the alkali metals and alkaline earth metals). It is preferable that the NOx adsorbing and reducing catalyst has a function serving as a usual three-way catalyst, and therefore may contain ceria, zirconia, lanthanum and/or the like which are usually employed in a three-way catalyst. In case that the NOx adsorbing and reducing catalyst has a function as a three-way catalyst, exhaust gas can be effectively purified in a condition (such as during engine acceleration) where the engine is operated at a high engine load on a stoichiometric air-fuel mixture.

During the lean operation of the engine, the air/fuel ratio of the air-fuel mixture to be supplied to the engine is preferably within a range of from 20 to 50 in which an adsorbing (trapping) reaction of NOx to the NOx adsorbing and reducing catalyst occurs at a high efficiency. During the rich operation of the engine, the air/fuel ratio of the air-fuel mixture is preferably within a range of from 11.0 to 14.7 in which the adsorbed NOx is converted into $N_2$ at a high efficiency in the NOx adsorbing and reducing catalyst.

In the exhaust gas purifying system of the present invention, the efficiency of conversion of NOx to $N_2$ becomes high as a temperature of exhaust gas at a location (in the exhaust gas passageway) immediately upstream of the NOx adsorbing and reducing catalyst is low. The conversion efficiency is particularly high at the exhaust gas temperature ranging from 150 to 250° C. In conventional catalysts, the reaction hindrance due to covering noble metal with CO is predominant as exhaust gas temperature is low. However, according to the exhaust gas purifying system of the present invention, the concentration of CO is regulated by the exhaust gas component concentration regulating device, so that exhaust gas low in CO concentration is flown into the NOx adsorbing and reducing catalyst on the downstream side, thereby reducing NOx into $N_2$ at a high efficiency.

Additionally, it is better that the concentration ratio of [$H_2$/CO] is as large as possible and set at a value of not smaller than 0.5, preferably not smaller than 1.0. This has been derived from the present inventor's knowledge that the reaction hindrance due to CO can be reduced when the concentration of CO is lowered whereas the conversion efficiency of NOx to $N_2$ can become sufficient when the concentration of $H_2$ is raised.

As the exhaust gas component concentration regulating device, there are a variety of devices, for example, a so-called rich exhaust gas CO and $H_2$ regulating catalyst for regulating the concentration of CO and $H_2$ in rich exhaust gas which has the air/fuel ratio richer (smaller) than the stoichiometric value. In concrete, an example of the rich exhaust gas CO and $H_2$ regulating catalyst is a shift reaction catalyst for promoting a water gas shift reaction represented by the following chemical formula (1):

$$CO + H_2O \rightarrow CO_2 + H_2 \qquad (1)$$

Under the action of the shift reaction catalyst, the reaction of oxidizing CO at the left side of the above formula (1) into $CO_2$ can effectively occur, exhaust gas having a large [$H_2$/CO] concentration ratio can be obtained. It is preferable that the shift reaction catalyst contains Pt, Rh and Ce (cerium) compound. It has been known that combination of a noble metal and ceria is advantageous for promoting the water gas shift reaction represented by the formula (1). In the rich exhaust gas CO and $H_2$ regulating catalyst, it is preferable that Pt and Rh of noble metals are used in combination with ceria, which is based on the present inventors' knowledge. Additionally, it is also preferable that the rich exhaust gas CO and $H_2$ regulating catalyst has a such a structure that a part of Pt and/or Rh is directly carried on the ceria, or activated alumina carries thereon ceria on which Pt and/or Rh are carried. The ceria preferably has a high heat resistance and may be in the form of complex oxide including zirconia, lanthanum and/or the like. Additionally, Pd may be added to the ceria in order to improve a low temperature activity of a three-way catalyst. The cerium is carried in an amount (calculated as cerium oxide) ranging preferably from 5 to 100 g, more preferably from 10 to 50 g per one liter of a substrate such as a honeycomb-type monolithic substrate. The substrate may be a pellet-type substrate.

Another example of the rich exhaust gas CO and $H_2$ regulating catalyst is a so-called $H_2$ low consumption catalyst which functions to consume a larger amount of CO than that of $H_2$ in the rich exhaust gas. By suppressing the consumption of $H_2$, exhaust gas having a [$H_2$/CO] concentration ratio larger than that in conventional exhaust gas purifying catalysts can be flown into the NOx adsorbing and reducing catalyst. The $H_2$ low consumption catalyst preferably contains, for example, compound(s) of Pt and Rh, and compound(s) of titanium and/or zirconium. Upon addition of titanium and/or zirconium, an oxidation reaction of CO can be promoted while oxidation of $H_2$ cannot be promoted as compared with the oxidation of CO, thereby providing exhaust gas having a large [$H_2$/CO] concentration ratio. It is preferable that titanium and/or zirconium is carried on a substrate preferably in an amount ranging preferably from 5 to 100 g and more preferably from 10 to 50 g (calculated as oxide) per one liter of the substrate.

A further example of the rich exhaust gas CO and $H_2$ regulating catalyst is a so-called CO decreasing catalyst for decreasing the concentration of CO in the rich exhaust gas. To reduce CO in the rich exhaust gas, it is sufficient to cause CO to be effectively adsorbed to the CO decreasing catalyst. This can provide exhaust gas having a [$H_2$/CO] concentration ratio larger than that in conventional exhaust gas purifying catalysts. The CO decreasing catalyst preferably contains compound(s) of noble metal(s) such as Pt, Pd and/or Rh (including any combinations of the noble metals), and alkali metal(s) and/or alkaline earth metal(s) such as Na, K, Rb, Cs, Mg, Ca, Sr and/or Ba (including any combination of the metals). With the Co decreasing catalyst, it is assumed that the alkali metal and/or alkaline earth metal compound(s) adsorbs or traps CO in the rich exhaust gas and make reaction to convert CO into carbonate, thereby providing exhaust gas having a large [$H_2$/CO] concentration ratio.

The rich exhaust gas CO and $H_2$ regulating catalyst used in the exhaust gas purifying catalyst of the present invention is one of the shift reaction catalyst, the $H_2$ low consumption catalyst and the CO decreasing catalyst which function to regulate the concentration of carbon monoxide and hydrogen in the rich exhaust gas, disposed in the exhaust gas passageway of the engine. Otherwise, two or more of the shift reaction catalyst, the $H_2$ low consumption catalyst and the CO decreasing catalyst may be used in combination as the rich exhaust gas CO and $H_2$ regulating catalyst. Furthermore, the catalyst metals (components) of the shift reaction catalyst, the $H_2$ low consumption catalyst and the CO decreasing catalyst may be carried on a single substrate by separately coating the single substrate with slurries which respectively contain the catalyst metals of the above three catalysts. The catalyst metals (components) are preferably carried on porous carrier such as alumina, silica, titania and/or the like. The porous carrier carrying the catalyst metals is preferably supported or carried on the substrate such as a cordierite honeycomb-type monolithic substrate.

It will be understood that the exhaust gas component regulating device is not limited to the above three kinds of the catalysts and therefore may be a device or means for regulating combustion of the engine. For example, the [$H_2$/CO] concentration ratio may be regulated by promoting the reaction represented by the following reaction formula (1) upon lowering a combustion temperature of the engine:

$$CO + H_2O \rightarrow CO_2 + H_2 \qquad (1)$$

In general, the [$H_2$/CO] concentration ratio of exhaust gas discharged from the engine is determined according to the thermal equilibrium in the water gas shift reaction represented by the above reaction formula (1), as discussed above. This shift reaction tends to be promoted as the temperature of exhaust gas is low. Accordingly, by lowering the temperature within engine cylinders, the concentration of $H_2$ can be raised while lowering the concentration of CO in exhaust gas discharged from the engine cylinders. Additionally, by raising the concentration of $H_2O$ in exhaust gas, the shift reaction of the formula (1) can be promoted. For example, by raising the concentration of $H_2O$ in the engine cylinders, the [$H_2$/CO] concentration ratio can be enlarged.

A second embodiment of the exhaust gas purifying system according to the present invention will be discussed hereinafter.

The exhaust gas purifying system is for an internal combustion engine and comprises a NOx adsorbing (trapping) catalyst disposed in an exhaust gas passageway of the engine, the NOx adsorbing catalyst functioning to adsorb and release nitrogen oxides in accordance with a temperature of exhaust gas. The NOx adsorbing catalyst functions to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature condition in which exhaust gas has a temperature of not lower than 200° C. Exhaust gas discharged from the NOx adsorbing catalyst has a concentration ratio (volume) of [nitrogen oxides (NOx)/carbon monoxide (CO)] which is not larger than 0.3 in the first exhaust gas temperature range. Additionally, an oxidizing catalyst is disposed in the exhaust gas passageway downstream of the NOx adsorbing catalyst, for oxidizing oxidizable components in exhaust gas discharged from the NOx adsorbing catalyst.

Thus, in this exhaust gas purifying system, the NOx adsorbing catalyst for regulating adsorption (trap) and release of NOx in accordance with the temperature of exhaust gas is disposed in the exhaust gas passageway at the upstream side, while the oxidizing catalyst is disposed in the exhaust gas passageway downstream of the NOx adsorbing catalyst. The NOx adsorbing catalyst causes exhaust gas having a small [nitrogen oxides (NOx)/carbon monoxide (CO)] concentration ratio to flow to the oxidizing catalyst when exhaust gas is in a low temperature region, thereby effectively removing or oxidizing HC, CO and NOx in the rich exhaust gas. In other words, the NOx adsorbing catalyst functions to adsorb nitrogen oxides in exhaust gas in the first exhaust gas temperature range in which exhaust gas has a temperature ranging from a level at engine starting to 140° C. and release the adsorbed nitrogen oxides in the second exhaust gas temperature range in which exhaust gas has a temperature of not lower than 200° C. Additionally, in the first exhaust gas temperature range, the [nitrogen oxides/carbon monoxide] concentration ratio is regulated to be not larger than 0.3.

The NOx adsorbing catalyst and the oxidizing catalyst includes porous carrier on which catalyst components such as noble metal(s) is carried. The porous carrier is formed of a material such as alumina, silica, silica-alumina, titania or the like, though the material is not limited to a particular one. It is preferable that the porous carrier is formed of alumina which is high in heat resistance and in characteristics for dispersing noble metal(s). Additionally, the porous carrier is preferably coated on a honeycomb-type monolithic substrate formed of cordierite or metal. The porous carrier formed of the material such as alumina or silica may be coated on pellet-type substrate. Otherwise, the porous carrier formed of the material such as alumina or silica may be formed into the honeycomb-type or the pellet-type. It will be understood that the material of the porous carrier of the NOx adsorbing catalyst may be the same as or different from that of the oxidizing catalyst.

The NOx adsorbing catalyst contains catalyst component (s) or NOx adsorbing material which functions to adsorb (trap) and release NOx by changing the temperature of exhaust gas to be flown to the NOx adsorbing catalyst. It is preferable that the NOx adsorbing catalyst contains Pt (as the catalyst component) in an amount ranging from 0.1 to 10 g per one liter of the substrate such as the honeycomb-type monolithic substrate. The NOx adsorbing catalyst containing Pt adsorbs or traps NOx in the low exhaust gas temperature region, and release the adsorbed NOx when the temperature of exhaust gas is raised. If the amount of Pt is less than 0.1 g per one liter of the substrate, a practically sufficient catalytic activity for NOx cannot be obtained. If the amount of Pt exceeds 10 g per one liter of the substrate, the catalytic activity for NOx cannot be improved correspondingly to an increased amount of Pt, so as to be ineffective for improving the catalytic activity. It will be understood that Pt may be carried on the above-mentioned porous carrier by coating the porous carrier with Pt compound(s) such as chloride, nitrate or the like of Pt under conventional methods such as an impregnation method, a spray method, or a slurry mixing method. In the impregnation method, the porous carrier is impregnated with a fluid containing Pt compound(s). In the spray method, a fluid containing Pt compound(s) is sprayed onto the porous carrier. In the slurry mixing method, the porous carrier is mixed in a fluid containing Pt compound(s) to form a slurry.

It is preferable that the NOx adsorbing catalyst further contains, as the NOx adsorbing agent or catalyst component, alkali metal(s), alkaline-earth metal(s) and/or rare earth element(s) preferably in an amount ranging from 1 to 10 g per one liter of the substrate. Examples of alkali metal (elements of the group 2A in the periodic table of elements) are lithium (Li), sodium (Na), potassium (K), rubidium (Rb), cesium (Cs) and francium (Fr). Examples of alkaline-earth metal are beryllium (Be), magnesium (Mg), calcium (Ca), strontium (Sr) and barium (Ba). Examples of rare earth element are scandium (Sc), yttrium (Y), lanthanum (La), cerium (Ce), praseodymium (Pr) and neodymium (Nd). The NOx adsorbing catalyst preferably contains the above alkali metal(s), alkaline-earth metal(s) and/or rare earth element(s) serving as the NOx adsorbing material, preferably in an amount ranging from 1 to 50 g per one liter of the substrate (such as the honeycomb-type monolithic substrate). If the amount is less than 1 g per one liter of the substrate, a NOx adsorbing (trapping) ability of the NOx adsorbing catalyst is low thereby providing an insufficient NOx reducing or removing performance. If the amount exceeds 50 g per one liter of the substrate, a temperature at which NOx can be released is raised so that NOx may not sufficiently release; and an oxidizing ability of the catalyst is lowered so as to cause disadvantages such as impeding oxidation of NO to nitrogen dioxide ($NO_2$).

It is also preferable that the NOx adsorbing catalyst functions to adsorb NOx in exhaust gas at a temperature ranging from 100 to 140° C. so as to lower the concentration of NOx in exhaust gas. The NOx adsorbing catalyst containing, as the NOx adsorbing material, Pt and the above-mentioned alkali metal(s) or/and the like can adsorb NOx when the temperature of exhaust gas is within a range of from 100 to 140° C. thereby causing exhaust gas having a small [NOx/CO] concentration ratio to flow into the oxidizing catalyst located downstream of the NOx adsorbing catalyst, thus preventing the oxidizing catalyst from being lowered in activity for oxidizing CO. When the temperature of exhaust gas rises, the adsorbed NOx is released so as to accomplish regeneration of the NOx adsorbing catalyst.

The oxidizing catalyst preferably contains catalyst components for improving the activity for oxidizing CO at a low temperature, exhibiting a high activity for oxidizing HC and so-called soluble organic fraction (SOF) in lean exhaust gas which has an air/fuel ratio leaner (larger) than a stoichiometric value, particularly from a time immediately after engine starting.

The oxidizing catalyst preferably contains Pt in an amount ranging from 0.5 to 20 g per one liter of the substrate (such as the honeycomb-type monolithic substrate) thereby effectively oxidizing or removing CO, HC and SOF. If the amount of Pt is less than 0.5 g per one liter of the substrate, a practically sufficient catalytic activity cannot be obtained. If the amount of Pt exceeds 20 g per one liter of the substrate, the catalytic activity cannot be improved corresponding to an increased amount so that an effective use of Pt cannot be made. In the oxidizing catalyst, Pt is carried on the above-mentioned porous carrier by coating the porous carrier with Pt compound(s) such as chloride, nitrate or the like of Pt under conventional methods such as the impregnation method, the spray method, or the slurry mixing method. The porous carrier carrying Pt is preferably coated on the substrate such as the honeycomb-type monolithic substrate.

It is also preferable that the oxidizing catalyst contains zeolite in an amount ranging from 10 to 100 g per one liter of the substrate such as the honeycomb-type monolithic substrate. Examples of zeolite are mordenite, MFI, β-zeolite and the like, in which they are used singly or in combination. If the amount of zeolite is less than 10 g per one liter of the substrate, an absorption amount of HC, SOF and particulate matter (PM) is insufficient. If the amount of zeolite exceeds 100 g per one liter of the substrate, there is the possibility of the pores of the porous carrier being clogged with PM. By virtue of zeolite contained in the oxidizing catalyst, HC can be adsorbed in zeolite even when the temperature of exhaust gas is not higher than 140° C. thereby suppressing poisoning with HC. This prevents an oxidation catalytic activity of Pt from lowering thus improving a low temperature catalytic activity for CO. It is also preferable that zeolite is mixed with the porous carrier to form a layer coated on the substrate. This improves an effect for suppressing the HC poisoning to Pt as compared with a method in which zeolite is coated on a layer of the porous carrier carrying Pt.

Additionally, it is preferable that the oxidizing catalyst does not contain the above-mentioned alkali metal, alkaline-earth metal and/or rate earth element which serve as the NOx adsorbing material. By this, the oxidizing catalyst cannot adsorb NOx and therefore exhibits a high oxidation catalytic activity when exhaust gas is in a lean region (in which air/fuel ratio is larger or leaner than the stoichiometric level), thereby oxidizing and removing HC and CO under the action of NOx. In this connection, conventional three-way catalysts contain the above-mentioned alkali metal(s) and/or the like, and therefore cannot exhibit a high oxidation catalytic activity when exhaust gas is the lean region. In other words, the conventional three-way catalysts are raised in exhaust gas purifying ability by adding alkali metal(s), rare earth element(s) and/or the like to noble metal(s), in which CO, HC and NOx are simultaneously oxidized and reduced to be removed under catalytic reaction when exhaust gas is in a stoichiometric region (in which air/fuel ratio is generally stoichiometric). It is to be noted that the oxidizing catalyst of the present invention is expected to be high in oxidation catalytic activity in the lean region of exhaust gas, and therefore quite different from the conventional three-way catalysts.

In operation of the above-discussed exhaust gas purifying system, when the temperature of exhaust gas is within the range of from the level at engine starting to 140° C., NOx is adsorbed or trapped on Pt in the NOx adsorbing catalyst. In case that the NOx adsorbing catalyst contains also alkali metal(s), alkaline-earth metal and/or rare earth element(s), NOx is adsorbed also on them. Under such NOx adsorption, the [NOx/CO] concentration ratio of exhaust gas in the exhaust gas passageway between the NOx adsorbing catalyst and the oxidizing catalyst becomes not larger than 0.3. This exhaust gas having the small [NOx/CO] concentration ratio is flown into the oxidizing catalyst, upon which CO is oxidized to be removed under the oxidation catalytic activity of Pt while HC and SOF are adsorbed on zeolite (in case of using zeolite).

When the temperature of exhaust gas exceeds 140° C. and reaches a level lower than 200° C., the NOx adsorbing catalyst functions similarly to the above-discussed as follows: NOx is adsorbed or trapped on Pt. In case that the NOx adsorbing catalyst contains also alkali metal(s) and/or the like, NOx is adsorbed also on them. An adsorption equilibrium state of NOx may be maintained. At this time, the oxidizing catalyst functions as follows: CO is oxidized to be removed under the oxidation catalytic activity of Pt while HC and SOF are adsorbed on zeolite (in case of using zeolite) or maintained at an adsorption equilibrium state. Additionally, HC and SOF may be released and oxidized under the oxidation catalytic activity of Pt according to a flow rate of exhaust gas.

When the temperature of exhaust gas reaches a level over 200° C., the absorbed NOx is released from the NOx adsorbing catalyst, thereby accomplishing regeneration of the NOx adsorbing catalyst. In the oxidizing catalyst, CO is oxidized to be removed under the oxidation catalytic activity of Pt while HC and SOF are adsorbed on zeolite so as to be at the adsorption equilibrium state or released to be oxidized under the oxidation catalytic activity of Pt.

While the exhaust gas purifying systems of the embodiments have been shown and described as including the single NOx adsorbing catalyst and the single oxidizing catalyst, it will be understood that a plurality of the NOx adsorbing catalysts and a plurality of the oxidizing catalysts may be used respectively in place of the single NOx adsorbing catalyst and the single oxidizing catalyst so as to constitute a multiple stage NOx adsorbing catalyst and a multiple stage oxidizing catalyst. Additionally, the NOx adsorbing catalyst and the oxidizing catalyst may be combined to form a single unit. Further, a layer of the catalyst component(s) of the NOx adsorbing catalyst and a layer of the catalyst component(s) of the oxidizing catalyst may be coated on a single substrate such as the honeycomb-type monolithic substrate.

Figure 1:
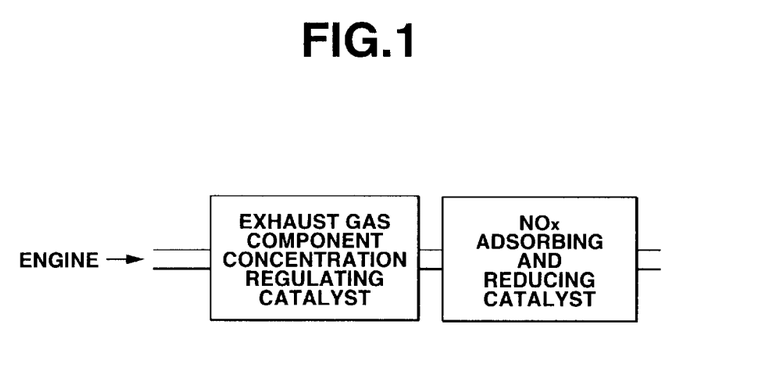
FIG. 1 is a schematic illustration of a first embodiment of an exhaust gas purifying system for an internal combustion engine, according to the present invention, having two catalysts.
Figure 2:
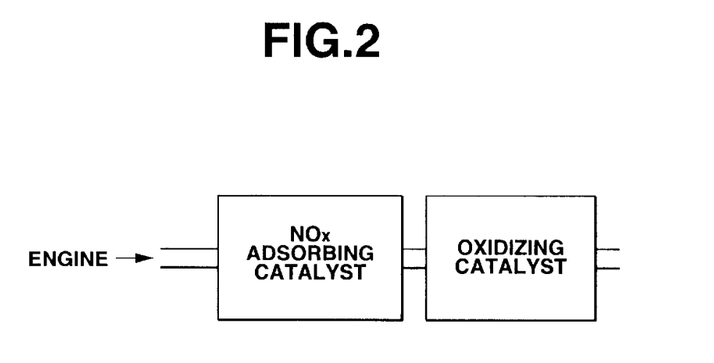
FIG. 2 is a schematic illustration of a second embodiment of the exhaust gas purifying system for an internal combustion engine, according to the present invention, having two catalysts.
Figure 3:
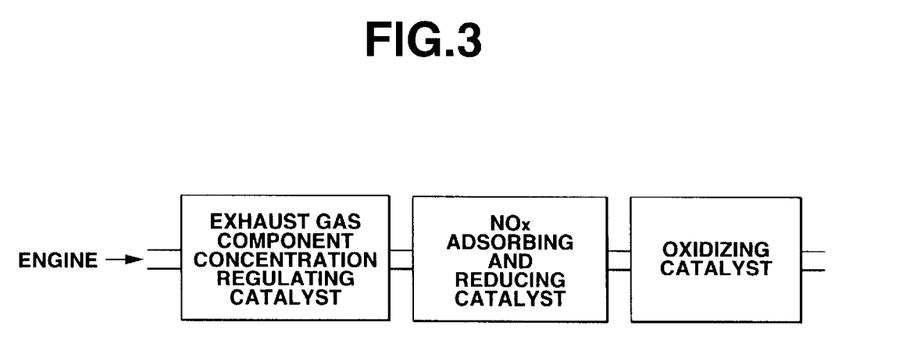
FIG. 3 is a schematic illustration of a further embodiment of the exhaust gas purifying system for an internal combustion engine, according to the present invention, having three catalysts.
Figure 4:
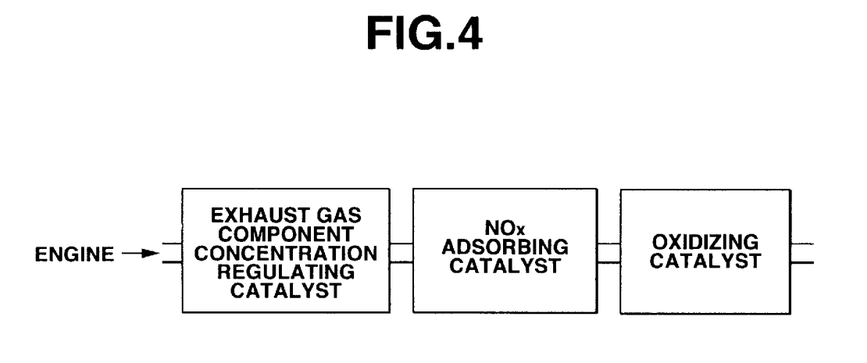
FIG. 4 is a schematic illustration of a still further embodiment of the exhaust gas purifying system for an internal combustion engine, according to the present invention, having three catalysts.
Figure 5:
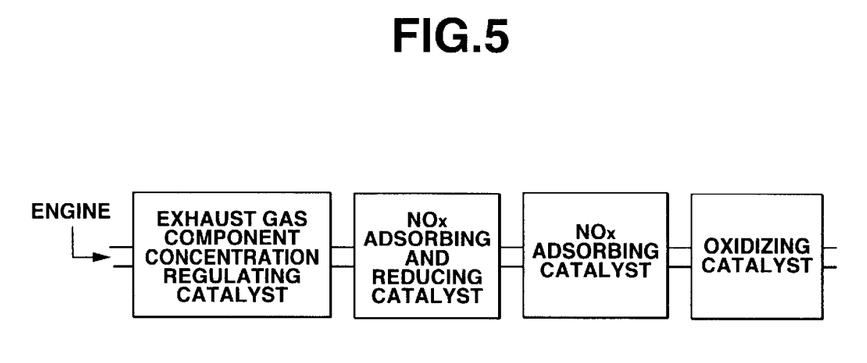
FIG. 5 is a schematic illustration of a still further embodiment of the exhaust gas purifying system for an internal combustion engine, according to the present invention, having four catalysts.

The exhaust gas purifying systems of the first and second embodiments may be combined to constitute an exhaust gas purifying system. Specifically, the exhaust gas component regulating device and/or the NOx adsorbing and reducing catalyst of the exhaust gas purifying system of the first embodiment and the NOx adsorbing catalyst and/or the oxidizing catalyst of the exhaust gas purifying system of the second embodiment may be combined to constitute an exhaust gas purifying system as shown in FIGS. 3 to 5. In the exhaust gas purifying system of FIG. 5, the NOx adsorbing and reducing catalyst and the NOx adsorbing catalyst may be replaced (in location) with each other so that the former catalyst is located to be downstream of the latter catalyst. It will be understood that the exhaust gas component regulating device, the NOx adsorbing and reducing catalyst and the oxidizing catalyst may be disposed in the exhaust gas passageway in the order mentioned in a direction of from the upstream side to the downstream side relative to flow of exhaust gas so as to constitute an exhaust gas purifying system as shown in FIG. 3. Additionally, the exhaust gas purifying system of the first embodiment may be modified such that the NOx adsorbing and reducing catalyst is replaced with the NOx adsorbing catalyst of the exhaust gas purifying system of the second embodiment. These combination arrangements can simultaneously achieve improvements both in NOx reduction efficiency in lean exhaust gas and in oxidation catalytic activity in exhaust gas in a low temperature region, thus purifying exhaust gas purification at a high efficiency.

EXAMPLES

The present invention will be more readily understood with reference to the following Examples in comparison with Comparative Examples; however, these Examples are intended to illustrate the invention and are not to be construed to limit the scope of the invention.

Example 1

Activated alumina powder was impregnated with a solution of dinitrodiammine Pt, and then dried and calcined in air at 400° C. for 1 hour thereby obtaining Pt-carrying alumina powder (Powder A) having a Pt concentration of 3.0% by weight.

Activated alumina powder was impregnated with an aqueous solution of Rh nitrate, and then dried and calcined in air at 400° C. for 1 hour, thereby obtaining Rh-carrying alumina powder (Powder B) having a Rh concentration of 2.0% by weight.

A porcelain ball mill was charged with 576 g of Powder A, 86 g of Powder B, 238 g of activated alumina powder and 900 g of water. Mixing and pulverization were made in the porcelain ball mill thereby obtaining a slurry. This slurry was coated on a cordierite honeycomb-type monolithic substrate having a volume of 1.7 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined in air at 400° C. for 1 hour thereby obtaining a catalyst formed with a coat layer having a weight of 200 g per one liter of the monolithic substrate.

The thus obtained catalyst was impregnated with an aqueous solution of Ba acetate, and dried and calcined in air at 400° C. for 1 hour thereby obtaining a catalyst (Catalyst A) formed with a coat layer having a weight of 250 g per one liter of the monolithic substrate.

Activated alumina powder was impregnated with a solution of cerium nitrate, and then dried in air at 600° C. for 1 hour thereby obtaining cerium-carrying alumina powder (Powder C). Powder C was impregnated with a solution of dinitrodiammine Pt, and then dried and calcined in air at 400° C. for 1 hour thereby obtaining Pt and Ce-carrying alumina powder (Powder D) having a cerium concentration of 5.0% by weight and a Pt concentration of 3.0% by weight.

Powder C was impregnated with an aqueous solution of Rh nitrate, and then dried and calcined in air at 400° C. for 1 hour thereby obtaining Rh and Ce-carrying alumina powder (Powder E) having a cerium concentration of 5.0% by weight and a Rh concentration of 2.0% by weight.

A porcelain ball mill was charged with 576 g of Powder D, 86 g of Powder E, 238 g of activated alumina powder and 900 g of water. Mixing and pulverization were made in the porcelain ball mill thereby obtaining a slurry. This slurry was coated on a cordierite honeycomb-type monolithic substrate having a volume of 1.3 liters and 400 cells per square inch. The cells were formed extending throughout the length of the monolithic substrate. The coated monolithic substrate was blown with air to remove excessive slurry in the cells under the action of air stream. Thereafter, the coated monolithic substrate was dried at 130° C. and then calcined in air at 400° C. for 1 hour thereby obtaining a catalyst (Catalyst B) formed with a coat layer having a weight of 200 g per one liter of the monolithic substrate.

An exhaust gas purifying catalyst of Example 1 was constituted by disposing Catalyst B in an exhaust gas passageway of an automotive internal combustion engine, and by disposing Catalyst A in the exhaust gas passageway downstream of Catalyst B. Catalyst B corresponded to the above-mentioned shift reaction catalyst.

Comparative Example 1

A catalyst C of Comparative Example 1 was produced by repeating the procedure of Example 1 with the exception that activated alumina powder was used in place of Powder C (cerium-carrying alumina powder) in preparation of Catalyst B.

An exhaust gas purifying catalyst of Comparative Example 1 was constituted by disposing Catalyst C in an exhaust gas passageway of an automotive internal combustion engine, and by disposing Catalyst A in the exhaust gas passageway downstream of Catalyst C.

Example 2

Catalyst D of Example 2 was produced by repeating the procedure of Example 1 with the exception that titania sol was used in place of the solution of cerium nitrate in preparation of Catalyst B.

An exhaust gas purifying catalyst of Example 2 was constituted by disposing Catalyst D in an exhaust gas passageway of an automotive internal combustion engine, and by disposing Catalyst A in the exhaust gas passageway downstream of Catalyst D. Catalyst D corresponded to the above-mentioned $H_2$ low consumption catalyst.

Example 3

Catalyst E of Example 3 was produced by repeating the procedure of Example 1 with the exception that a solution of zirconium nitrate was used in place of the solution of cerium nitrate in preparation of Catalyst B.

An exhaust gas purifying catalyst of Example 3 was constituted by disposing Catalyst E in an exhaust gas passageway of an automotive internal combustion engine, and by disposing Catalyst A in the exhaust gas passageway downstream of Catalyst E. Catalyst E corresponded to the above-mentioned $H_2$ low consumption catalyst.

Example 4

Catalyst F of Example 4 was produced by repeating the procedure of Example 1 with the exception that a solution of magnesium acetate was used in place of the solution of cerium nitrate in preparation of Catalyst B.

An exhaust gas purifying catalyst of Example 4 was constituted by disposing Catalyst F in an exhaust gas passageway of an automotive internal combustion engine, and by disposing Catalyst A in the exhaust gas passageway downstream of Catalyst F. Catalyst F corresponded to the above-mentioned CO decreasing catalyst.

Evaluation of Performance of Exhaust Gas Purifying System (1)

An internal combustion engine having a displacement of 2000 cc was provided with an exhaust system to which the exhaust gas purifying catalyst of Examples and Comparative Example was incorporated. An evaluation test of the exhaust gas purifying system was conducted as follows:

This engine was operated repeating a changing operational cycle (evaluation mode) including a first engine operation step of 30 seconds on air-fuel mixture having an air/fuel ratio of 20, a second engine operation step of 4 seconds on air-fuel mixture having an air/fuel ratio of 11.0, and a third engine operation step of 5 seconds on air-fuel mixture having an air/fuel ratio of 14.7. The first, second and third engine operation steps were successively made in the order named. Such engine operation was carried out in two manners one of which was to control the temperature of exhaust gas immediately upstream of the exhaust gas purifying system at 200° C. and the other was to control the temperature of exhaust gas immediately upstream of the exhaust gas purifying system at 350° C. During one changing operational cycle in each manner of the engine operation, a concentration (ppm) of an exhaust gas component (HC, CO, NOx) was measured at positions of the exhaust gas passageway upstream and downstream of the exhaust gas purifying system. Such measurement was conducted on the exhaust gas purifying catalyst in a state after a durability test, thereby calculating a conversion rate (%) shown in Table 1. The conversion rate (%) was calculated by [(the concentration of the gas component in the exhaust gas passageway upstream of the exhaust gas purifying system – the concentration of the gas component in the exhaust gas passageway downstream of the exhaust gas purifying system/the concentration of the gas component in the exhaust gas passageway upstream of the exhaust gas purifying system)×100].

The durability test was conducted as follows: The exhaust gas purifying catalyst of Examples and Comparative Examples was provided in an exhaust system of an internal combustion engine having a displacement of 4400 cc. The engine was operated for 50 hours in which the temperature of exhaust gas immediately upstream of the exhaust gas purifying system was kept at 750° C.

The results of the evaluation test on the exhaust gas purifying systems of Examples 1 to 4 and Comparative Example 1 are shown in Table 1.

TABLE 1

| | Conversion rate (%) | | | | | |
|---|---|---|---|---|---|---|
| | 200° C. | | | 350° C. | | |
| | HC | CO | NOx | HC | CO | NOx |
| Example 1 | 90 | 95 | 85 | 92 | 96 | 90 |
| Comp. Example 1 | 90 | 95 | 70 | 92 | 96 | 80 |
| Example 2 | 89 | 95 | 85 | 92 | 96 | 90 |
| Example 3 | 92 | 95 | 88 | 92 | 96 | 90 |
| Example 4 | 92 | 95 | 90 | 92 | 96 | 92 |

Example 5

Activated alumina powder was impregnated with a solution of dinitrodiammine Pt, and then dried and calcined in air at 400° C. for 1 hour thereby obtaining Pt-carrying alumina powder (Powder F) having a Pt concentration of 2.0% by weight.

A porcelain ball mill was charged with 750 parts by weight of Powder F, 1250 parts by weight of nitric acid-acidic alumina sol (having a solid content of 20% by weight) and 500 parts by weight of pure water. Mixing and pulverization were made for 1 hour in the porcelain ball mill thereby obtaining a slurry.

This slurry was coated on a cordierite honeycomb-type monolithic substrate having a volume of 0.3 liter and 400 cells per square inch, in which the cells were formed extending throughout the length of the monolithic substrate. The monolithic substrate had a thickness of walls (defining each cell) of 6 mil, so that the walls of the cells were coated with the slurry. The coated monolithic substrate was blown with air to remove excessive slurry in the cells under the action of air stream. Thereafter, the coated monolithic substrate was dried at 130° C. and then calcined at 500° C. for 1 hour thereby obtaining a catalyst (Catalyst G) formed with a coat layer having a weight of 200 g per one liter of the monolithic substrate.

A porcelain ball mill was charged with 400 parts by weight of Powder F, 350 parts by weight of mordenite, 1250 parts by weight of nitric acid-acidic alumina sol (having a solid content of 20% by weight) and 500 parts by weight of pure water. Mixing and pulverization were made for 1 hour thereby obtaining a slurry. This slurry was coated on a cordierite honeycomb-type monolithic substrate having a volume of 0.5 liter and 400 cells per square inch, in which the cells were formed extending throughout the length of the monolithic substrate. The monolithic substrate had a thickness of walls (defining each cell) of 6 mil, so that the walls of the cells were coated with the slurry. The coated monolithic substrate was blown with air to remove excessive slurry in the cells under the action of air stream. Thereafter, the coated monolithic substrate was dried at 130° C. and then calcined at 500° C. for 1 hour thereby obtaining a catalyst (Catalyst H) formed with a coat layer having a weight of 200 g per one liter of the monolithic substrate.

An exhaust gas purifying catalyst of Example 5 was constituted by disposing Catalyst G in a gas passageway, and by disposing Catalyst H in the gas passageway downstream of Catalyst G. The Catalysts G, H were located adjacent each other, forming a clearance of 1 to 10 cm between them.

Example 6

Catalyst I of Example 6 was produced by repeating the procedure of Example 5 except for the following: Catalyst G was dipped in an aqueous solution of barium acetate, and then drawn up from the aqueous solution and dried at 250° C. The thus dried catalyst was calcined at 300° C. for 1 hour, thereby obtaining a catalyst (Catalyst I) carrying Ba.

An exhaust gas purifying catalyst of Example 6 was constituted by disposing Catalyst I in a gas passageway of an automotive internal combustion engine, and by disposing Catalyst H in the gas passageway downstream of Catalyst I. The Catalysts I, H were located adjacent each other, forming the clearance therebetween.

Comparative Example 3

Activated alumina powder was impregnated with an aqueous solution of palladium chloride, and then dried and calcined in air at 400° C. for 1 hour thereby obtaining Pd-carrying alumina powder (Powder G) having a Pd concentration of 2.0% by weight.

A porcelain ball mill was charged with 750 parts by weight of Powder G, 1250 parts by weight of nitric acid-acidic alumina sol (having a solid content of 20% by weight) and 500 parts by weight of pure water. Mixing and pulverization were made for 1 hour in the ball mill, thereby obtaining a slurry.

This slurry was coated on a cordierite honeycomb-type monolithic substrate having a volume of 0.5 liter and 400 cells per square inch, in which the cells were formed extending throughout the length of the monolithic substrate. The monolithic substrate had a thickness of walls (defining each cell) of 6 mil, so that the walls of the cells were coated with the slurry. The coated monolithic substrate was blown with air to remove excessive slurry in the cells under the action of air stream. Thereafter, the coated monolithic substrate was dried at 130° C. and then calcined at 500° C. for 1 hour thereby obtaining a catalyst (Catalyst J) formed with a coat layer having a weight of 200 g per one liter of the monolithic substrate.

An exhaust gas purifying catalyst of Comparative Example 3 was constituted by disposing Catalyst G in a gas passageway of an automotive internal combustion engine, and by disposing Catalyst J in the gas passageway downstream of Catalyst G. The Catalysts G and J were located adjacent each other, forming the clearance between them.

Comparative Example 4

A porcelain ball mill was charged with 750 parts by weight of activated alumina, 1250 parts by weight of nitric acid-acidic alumina sol (having a solid content of 20% by weight) and 500 parts by weight of pure water. Mixing and pulverization were made for 1 hour in the ball mill.

This slurry was coated on a cordierite honeycomb-type monolithic substrate having a volume of 0.3 liter and 400 cells per square inch, in which the cells were formed extending throughout the length of the monolithic substrate. The monolithic substrate had a thickness of walls (defining each cell) of 6 mil, so that the walls of the cells were coated with the slurry. The coated monolithic substrate was blown with air to remove excessive slurry in the cells under the action of air stream. Thereafter, the coated monolithic substrate was dried at 130° C. and then calcined at 500° C. for 1 hour thereby obtaining a catalyst formed with a coat layer having a weight of 250 g per one liter of the monolithic substrate.

Subsequently, the thus obtained catalyst was dipped in an aqueous solution (having a certain concentration) of dinitrodiammine Pt and then drawn up from the aqueous solution. Thereafter, the catalyst was blown to remove excessive water content, and then dried at 250° C. so as to obtain a catalyst carrying Pt.

Next, the thus obtained catalyst was dipped in an aqueous solution (having a certain concentration) of rhodium nitrate and then drawn up from the aqueous solution. Thereafter, the catalyst was blown to remove excessive water content, and then dried at 250° C. thereby obtaining a Pt and Rh-carrying catalyst having a Pt concentration of 2.73% by weight and a Rh concentration of 0.27% by weight.

Further, the thus obtained Pt and Rh-carrying catalyst was dipped in a solution (having a certain concentration) of barium acetate and then drawn up from the solution. Thereafter, the catalyst was blown to remove excessive water content, and then dried at 250° C. and calcined at 300° C. for 1 hour, thereby obtaining a catalyst (Catalyst K) carrying Ba in an amount (calculated as BaO) of 10 g per one liter of the monolithic substrate.

An exhaust gas purifying catalyst of Comparative Example 4 was constituted by disposing Catalyst G in a gas passageway of an automotive internal combustion engine, and by disposing Catalyst K in the gas passageway downstream of Catalyst G. The Catalysts G, K were located adjacent each other, forming the clearance between them.

Catalyst components of the exhaust gas purifying systems of Examples 5 and 6 and Comparative Examples 2 to 4 are summarized in Table 2.

TABLE 2

| | Upstream-side catalyst | Downstream-side catalyst | NO/CO downstream of NOx adsorbing catalyst | Conversion rate (%) | |
|---|---|---|---|---|---|
| | | | | CO | HC |
| Example 5 | Pt/alumina | Pt + zeolite | 0.2 | 86 | 61 |
| Example 6 | Pt/alumina +Ba | Pt + zeolite | 0.15 | 87 | 60 |
| Comp. Example 2 | — | Pt + zeolite | 1.0 | 15 | 60 |
| Comp. Example 3 | Pt/alumina | Pd + zeolite | 0.2 | 52 | 63 |
| Comp. Example 4 | Pt/alumina | Pt, Rh | 0.2 | 40 | 0 |

Evaluation of Performance of Exhaust Gas Purifying System (2)

<Evaluation A>

Tests for evaluating catalytic activity were conducted on the exhaust gas purifying systems of Examples 5 and 6 and Comparative Examples 2 to 4. The test for each exhaust gas purifying system was carried out in test conditions shown at a part of "Evaluation test" in Table 3. In this test, the upstream-side catalyst (NOx adsorbing catalyst) and the downstream-side catalyst (oxidizing catalyst) were located adjacent and axially aligned with each other, and disposed in a casing which forms part of the gas passageway. A model gas for (performance) evaluation purpose simulated exhaust gas of an automotive vehicle and was flown through the gas passageway at a flow rate of 60 liters per minute, in which the temperature of the gas in the gas passage immediately upstream (at the inlet) of the exhaust gas purifying system was kept at 130° C. The model gas had a composition shown in the part of "Evaluation test" in Table 3. In these tests, the upstream-side (NOx adsorbing) catalyst had a volume of 0.02 liter, while the downstream-side (oxidizing) catalyst had a volume of 0.04 liter. In these tests, a concentration (ppm) of a gas component (CO, HC) was measured at positions of the gas passageway upstream and downstream of the exhaust gas purifying system. Such measurement was made on the exhaust gas purifying system in a state after completion of a durability test, thereby calculating a conversion rate (%) which is shown in Table 2. The conversion rate (%) was calculated by [(the concentration of the gas component in the gas passageway upstream of the exhaust gas purifying system–the concentration of the gas component in the gas passageway downstream of the exhaust gas purifying system/the concentration of the gas component in gas passageway upstream of the exhaust gas purifying system)×100].

The durability test was conducted on each of the exhaust gas purifying systems of Examples 5 and 6 and Comparative Examples 2 to 4 in test conditions shown at a part of "Durability test" in Table 3. In this test, the upstream-side catalyst (NOx adsorbing catalyst) and the downstream-side catalyst (oxidizing catalyst) were located adjacent and axially aligned with each other, and disposed in a casing which forms part of a gas passageway. A model gas for durability test purpose simulated exhaust gas of an automotive vehicle and was flown through the gas passageway and through the upstream-side and downstream-side catalysts at a flow rate of 60 liters per minute for 10 hours, in which the temperature of the model gas in the gas passage immediately upstream (at the inlet) of the exhaust gas purifying system was kept at 500° C. The model gas had a composition shown in the part of "Durability test" in Table 3.

TABLE 3

| Durability test | | |
|---|---|---|
| Temp. of model gas at inlet | 500° C. | |
| Test time | 10 hours | |
| Composition of model gas at inlet of exhaust gas purifying system | CO | 500 ppm |
| | HC(C$_3$H$_6$) | 300 ppm |
| | NO | 500 ppm |
| | O$_2$ | 10 vol. % |
| | SO$_2$ | 20 ppm |
| | CO$_2$ | 10 vol. % |
| | H$_2$O | 10 vol. % |
| | N$_2$ | balance |
| Evaluation test | | |
| Temp. of model gas at inlet | 130° C. | |
| Composition of model gas at inlet of exhaust gas purifying system | CO | 1000 ppm |
| | HC(C$_3$H$_6$) | 300 ppm |
| | NO | 500 ppm |
| | O$_2$ | 10 vol. % |
| | CO$_2$ | 10 vol. % |
| | H$_2$O | 10 vol. % |
| | N$_2$ | balance |

<Evaluation B>

The same tests as those of <Evaluation A> for evaluating catalytic activity were conducted on a variety of modes of the exhaust gas purifying system of Example 5, different in volume of the upstream-side (NOx adsorbing) catalyst and in volume of the downstream-side (oxidizing) catalyst as shown in Table 4. The exhaust gas purifying systems of Example 5 had been subjected to the durability test in <Evaluation B>. In these tests, the conversion rates for CO and HC were measured to evaluate the catalytic activities of the exhaust gas purifying systems. The results of these tests are shown in Table 4.

TABLE 4

| NO/CO downstream of NOx adsorbing catalyst | Volume (liter) of upstream-side catalyst | Volume (liter) of downstream-side catalyst | Convention rate (%) | |
|---|---|---|---|---|
| | | | CO | HC |
| 0.1 | 0.03 | 0.04 | 90 | 62 |
| 0.2 | 0.02 | 0.04 | 86 | 61 |
| 0.3 | 0.01 | 0.04 | 80 | 65 |
| 0.4 | 0.005 | 0.04 | 40 | 63 |
| 0.5 | None | 0.04 | 15 | 60 |

The test results of <Evaluation A> and <Evaluation B> reveal that the exhaust gas purifying systems of Examples 5 and 6 are high in catalytic activity and exhibit high conversion performances for HC and CO even in a low exhaust gas temperature region while providing high conversion performances for HC and CO, as compared with the exhaust gas purifying systems of Comparative Examples 2 to 4.

As apparent from the above, according to the present invention, the concentrations of the gas components of exhaust gas is regulated and/or adsorption and release of NOx are regulated in accordance with the temperature of exhaust gas. Accordingly, NOx in the oxygen-excessive region of exhaust gas discharged from the engine can be effectively reduced or removed, and/or CO and HC can be effectively oxidized or removed even if exhaust gas is in a low temperature range.

The entire contents of Japanese Patent Application P2000-283961 (filed Sep. 19, 2000) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An exhaust gas purifying system for an internal combustion engine comprising:
   an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5% by volume and such that a volume concentration ratio of hydrogen to carbon monoxide is not smaller than 0.5, in a first exhaust gas condition in which air/fuel ratio of exhaust gas is within a range of from a rich value and a stoichiometric value; and
   a NOx adsorbing and reducing catalyst disposed in the exhaust gas passageway downstream of said exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition;
   wherein said NOx adsorbing catalyst is disposed in the exhaust gas passageway of the engine and is adapted to adsorb and release nitrogen oxides in exhaust gas in accordance with a temperature of exhaust gas, said exhaust gas purifying system including an oxidizing catalyst in the exhaust gas passageway downstream of said NOx adsorbing catalyst, for oxidizing oxidizable components in exhaust gas discharged from said NOx adsorbing catalyst, and
   wherein said NOx adsorbing catalyst is adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature condition in which exhaust gas has a temperature of not lower than 200° C., exhaust gas discharged from said NOx adsorbing catalyst having a volume concentration ratio of nitrogen oxides/carbon monoxide which is not larger than 0.3 in the first exhaust gas temperature range.

2. An exhaust gas purifying system for an internal combustion engine comprising:
   an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5% by volume and such that a volume concentration ratio of hydrogen to carbon monoxide is not smaller than 0.5, in a first exhaust gas condition in which air/fuel ratio of exhaust gas is within a range of from a rich value and a stoichiometric value; and
   a NOx adsorbing and reducing catalyst disposed in the exhaust gas passageway downstream of said exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition;
   wherein said NOx adsorbing catalyst is disposed in the exhaust gas passageway downstream of said exhaust gas component regulating device, and an oxidizing catalyst in the exhaust gas passageway downstream of the at least one of said NOx adsorbing and reducing catalyst and said NOx adsorbing catalyst, and
   wherein said NOx adsorbing catalyst is adapted to adsorb and release nitrogen oxides in accordance with a temperature of exhaust gas and said NOx adsorbing catalyst is adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature range in which exhaust gas has a temperature of not lower than 200° C., exhaust gas discharged from said NOx adsorbing catalyst having a volume concentration ratio of nitrogen oxides/carbon monoxide which is not larger than 0.3 in the first exhaust gas temperature range, said oxidizing catalyst being adapted to oxidize oxidizable components in exhaust gas discharged from the at least one of said NOx adsorbing and reducing catalyst and said NOx adsorbing catalyst.

3. An exhaust gas purifying system for an internal combustion engine comprising:
   an exhaust gas component concentration regulating device disposed in an exhaust gas passageway of the engine, for regulating concentrations of gas components in exhaust gas discharged from the engine such that the concentrations of carbon monoxide and hydrogen are respectively not more than 2.0% by volume and not less than 0.5% by volume and such that a volume concentration ratio of hydrogen to carbon monoxide is not smaller than 0.5, in a first exhaust gas condition in which air/fuel ratio of exhaust gas is within a range of from a rich value and a stoichiometric value; and
   a NOx adsorbing and reducing catalyst disposed in the exhaust gas passageway downstream of said exhaust gas component concentration regulating device, for adsorbing nitrogen oxides in a second exhaust gas condition in which the air/fuel ratio of exhaust gas is at a lean value, and reducing the nitrogen oxides into nitrogen in the first exhaust gas condition;
   wherein said NOx adsorbing catalyst is disposed in the exhaust gas passageway of the engine, said NOx adsorbing catalyst is adapted to adsorb and release nitrogen oxides in accordance with a temperature of exhaust gas, and said NOx adsorbing catalyst is adapted to adsorb nitrogen oxides in exhaust gas in a first exhaust gas temperature range in which exhaust gas has a temperature ranging from a level at engine starting to 140° C. and release the adsorbed nitrogen oxides in a second exhaust gas temperature range in which exhaust gas has a temperature of not lower than 200° C., exhaust gas discharged from said NOx adsorbing catalyst having a volume concentration ratio of nitrogen oxides/carbon monoxide which is not larger than 0.3 in the first exhaust gas temperature range; and wherein an oxidizing catalyst is disposed in the exhaust gas passageway downstream of said NOx adsorbing catalyst, for oxidizing oxidizable components in exhaust gas discharged from said NOx adsorbing catalyst.

4. An exhaust gas purifying system as claimed in claim 3, wherein said NOx adsorbing catalyst is adapted to adsorb nitrogen oxides in exhaust gas in a third exhaust gas temperature range in which exhaust gas has a temperature ranging from 100 to 140° C.

5. An exhaust gas purifying system as claimed in claim 3, wherein said NOx adsorbing catalyst includes a substrate, and platinum carried on the substrate, in an amount ranging from 0.1 to 10 g per one liter of the substrate.

6. An exhaust gas purifying system as claimed in claim 5, wherein said NOx adsorbing catalyst contains at least one of alkali metal, alkaline-earth metal and rare earth element, carried on the substrate in an amount ranging from 1 to 50 g per one liter of the substrate.

7. An exhaust gas purifying system as claimed in claim 3, wherein said oxidizing catalyst includes a substrate, and platinum carried on the substrate, in an amount ranging from 0.5 to 20 g per one liter of the substrate.

8. An exhaust gas purifying system as claimed in claim 7, wherein said oxidizing catalyst includes zeolite carried on the substrate, in an amount ranging form 10 to 100 g per one liter of the substrate.

* * * * *